(No Model.)
G. H. REED.
WINDOW JACK.
No. 430,971. Patented June 24, 1890.
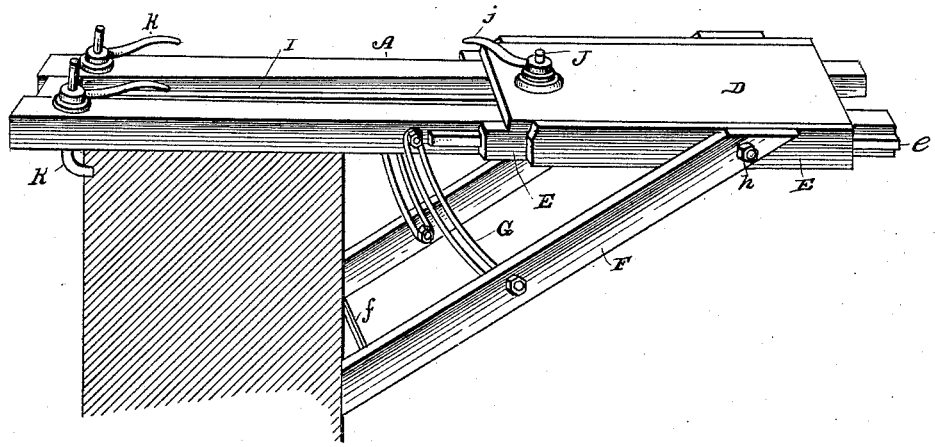
Fig. 1.
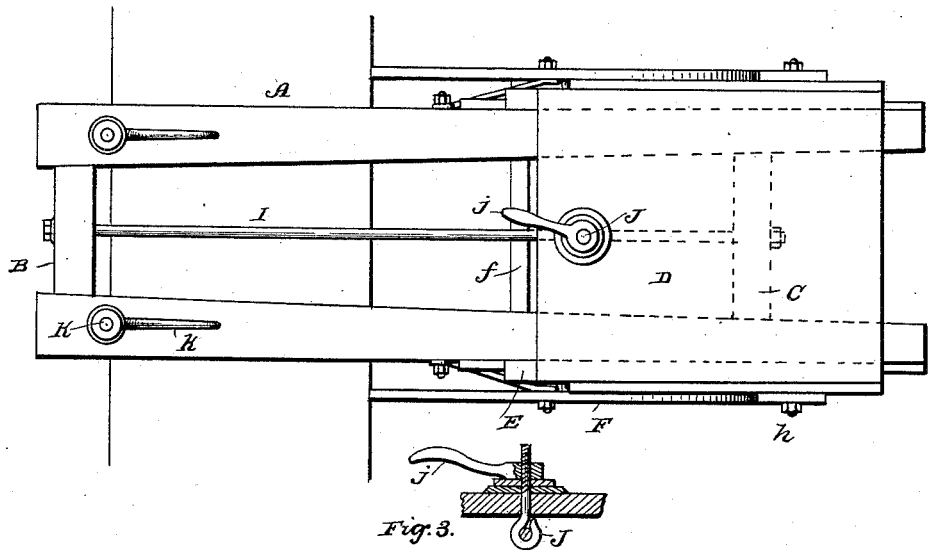
Fig. 2.
Fig. 3.
ATTEST.
Victor J. Evans.
Van Buren Hillyard.
INVENTOR.
George H. Reed.
By R. S. & A. P. Lacey, Attys.

UNITED STATES PATENT OFFICE.

GEORGE H. REED, OF GARDNER, KANSAS.

WINDOW-JACK.

SPECIFICATION forming part of Letters Patent No. 430,971, dated June 24, 1890.

Application filed March 5, 1890. Serial No. 342,770. (No model.)

*To all whom it may concern:*

Be it known that I, GEORGE H. REED, a citizen of the United States, residing at Gardner, in the county of Johnson and State of Kansas, have invented certain new and useful Improvements in Adjustable Painters' and Carpenters' Window-Jacks; and I do hereby declare the following to be a full, clear, and exact description of the invention, such as will enable others skilled in the art to which it appertains to make and use the same.

This invention relates to window-jacks, and aims to provide a jack that will be simple, efficient, durable, light, and convenient to operate, and capable of being quickly adjusted to different thicknesses of walls.

The improvement consists of a frame having clamps at one end and a sliding platform at the other end, a leg-section pivoted to the sliding platform, and hangers between the frame and said leg-section, the parts being so arranged that an adjustment of the platform adapts the leg-section for different thicknesses of walls.

The improvement further consists of the details of construction, which hereinafter will be more fully described and claimed, and which are shown in the accompanying drawings, in which—

Figure 1 is a perspective view of a jack, showing its application. Fig. 2 is a top plan view of the jack. Fig. 3 is a detail cross-section on the line $x\ x$ of Fig. 2, showing the hand-nut turned to full side view.

The frame comprises the side bars A A and the end bars B and C, the end bar C being preferably set in from the ends of the side bars. The clamping devices, consisting of the L-bolts K and the hand-nuts $k$, are placed at one end of the frame and the sliding platform D is arranged at the other end of the frame. The cleats E at the edges of the platform embrace the edges of the frame, and are held thereto and guided in their movements by a tongue or rib $e$ on the side bars A entering a corresponding groove in the said cleats. The leg-section F, pivoted at $h$ to the sliding platform, is connected between its ends by the links G with the frame, and is braced by the cross-bar $f$ at its lower end.

The rod I extends parallel with the side bars A A, and is secured at its ends in the bars C and B. The sliding platform is held in a located position by the eyebolt J, through which the rod I passes, and the hand-nut $j$, which is mounted on the said eyebolt. To adjust the platform, first loosen the hand-nut $j$. This releases the platform, which can then be moved to the desired position, after which it is made fast by retightening the said nut $j$.

The links G, being of a fixed length, obviously when the platform is moved on the frame the pivots $h$ of the leg-section will be moved a greater or less distance from the pivotal connection of links G with the frame; hence the free ends of the leg-section will be carried to or from a vertical plane, thereby adapting the jack for different thicknesses of walls.

The pivotal connections between the links G and the frame and the leg-section do not have a movement in the ways in the links G, except when folding the leg-section on the frame when the jack is not required for immediate use. When in use, the said pivotal connections are at the extreme limit of their movements in the links, in that the strain is outward on the lower end of the said leg-section. In the adjustment of the jack the leg-section turns on its pivotal connection with the links; hence, as the upper end of the leg-section is moved along on the frame, obviously the lower end of the leg-section will be correspondingly in or out, thereby adapting the jack for different thicknesses of walls.

Having thus fully described my invention, what I claim, and desire to secure by Letters Patent, is—

1. A painter's jack comprising a frame having clamping devices at one end and a sliding platform at the other end, a leg-section pivotally connected with the platform, and links connecting the said leg-section at a point between its ends with the frame, substantially as described.

2. The hereinbefore-specified painter's jack, comprising a frame, the L-bolts and hand-nuts K and $k$ at one end, the sliding platform at the other end having cleats which embrace the edges of the frame and are held thereto by a tongue-and-groove connection, the links connecting the said leg-section at a
5 point between its ends with the frame, the rod I, the eyebolt J, and hand-nut $j$, substantially as described.

In testimony whereof I affix my signature in presence of two witnesses.

GEORGE H. REED.

Witnesses:
L. B. MOORE,
J. T. CRAMER.